(12) United States Patent
Kim (10) Patent No.: US 9,851,583 B2
(45) Date of Patent: Dec. 26, 2017

(54) SINGLE FOCUS LENS AND PHOTOGRAPHIC APPARATUS INCLUDING THE SAME

(71) Applicant: Samsung Electronics Co., Ltd., Gyeonggi-do (KR)

(72) Inventor: Dong-woo Kim, Gyeonggi-do (KR)

(73) Assignee: Samsung Electronics Co., Ltd., Yeongton-gu, Suwon-si, Gyeonggi-do (KR)

( * ) Notice: Subject to any disclaimer, the term of this patent is extended or adjusted under 35 U.S.C. 154(b) by 1 day.

(21) Appl. No.: 15/072,660

(22) Filed: Mar. 17, 2016

(65) Prior Publication Data
US 2016/0282583 A1 Sep. 29, 2016

(30) Foreign Application Priority Data
Mar. 23, 2015 (KR) ......................... 10-2015-0040213

(51) Int. Cl.
*G02B 27/64* (2006.01)
*G02B 13/04* (2006.01)
*G02B 9/34* (2006.01)

(52) U.S. Cl.
CPC .......... *G02B 27/646* (2013.01); *G02B 13/04* (2013.01); *G02B 9/34* (2013.01)

(58) Field of Classification Search
CPC .. G02B 27/64; G02B 27/646; G02B 13/0035; G02B 13/004; G02B 9/12; G02B 9/34; G03B 2205/0007; G03B 2205/0015; H04N 5/23248; H04N 5/23264; H04N 5/2328; H04N 5/23287

USPC ....... 359/554, 557, 642, 708, 715, 754, 771, 359/781, 784; 396/52, 55; 348/208.99, 348/208.4, 208.11, 208.7
See application file for complete search history.

(56) References Cited

U.S. PATENT DOCUMENTS

| 9,213,219 | B2 | 12/2015 | Kuzuhara et al. | |
| 2012/0212842 | A1 | 8/2012 | Hosoi et al. | |
| 2013/0027585 | A1* | 1/2013 | Souma | G02B 15/177 348/240.1 |
| 2013/0141616 | A1* | 6/2013 | Imaoka | G02B 27/646 348/240.1 |
| 2015/0070520 | A1* | 3/2015 | Hagiwara | G02B 27/646 348/208.11 |

FOREIGN PATENT DOCUMENTS

| JP | 2012-173299 A | 9/2012 |
| JP | 2013-83783 A | 5/2013 |
| JP | 2014-142604 A | 8/2014 |

* cited by examiner

*Primary Examiner* — Arnel C Lavarias
(74) *Attorney, Agent, or Firm* — Cha & Reiter, LLC.

(57) ABSTRACT

A single focus lens including: a first lens group having a negative refractive power; a second lens group having a positive refractive power, the second lens group being arranged to move in a direction that is transverse to an optical axis of the single focus lens; a third lens group having a negative refractive power that is arranged to perform a focusing function; and a rear lens group disposed between the third lens group and an image side of the single focus lens, wherein the first lens group, the second lens group, the third lens group, and the rear lens group are ordered sequentially from an object side of the single focus lens to the image side of the single focus lens.

14 Claims, 7 Drawing Sheets

SINGLE FOCUS LENS AND PHOTOGRAPHIC APPARATUS INCLUDING THE SAME

CLAIM OF PRIORITY

This application claims the benefit of Korean Patent Application No. 10-2015-0040213, filed on Mar. 23, 2015, in the Korean Intellectual Property Office, the disclosure of which is incorporated herein in its entirety by reference.

BACKGROUND

1. Field

The present disclosure relates to optical devices, in general, and more particularly to a single focus lens and photographic apparatus including the same.

2. Description of the Related Art

Photographing apparatuses using a solid-state imaging device, such as a charge-coupled device (CCD) or a complementary metal-oxide semiconductor (CMOS) device, are widely used. In photographing apparatuses using the solid-state imaging device, such as digital cameras, interchangeable lens systems, video cameras, etc., there is user demand for high resolution and high quality. Photographing apparatuses using solid-state imaging devices are suitable for small apparatuses, and thus, have been recently applied to small information terminals such as portable phones.

However, it is not easy to satisfy high resolution and high quality requirements while making a photographic apparatus or a lens system smaller.

SUMMARY

According to aspects of the disclosure, a single focus lens is provided comprising: a first lens group having a negative refractive power; a second lens group having a positive refractive power, the second lens group being arranged to move in a direction that is transverse to an optical axis of the single focus lens; a third lens group having a negative refractive power that is arranged to perform a focusing function; and a rear lens group disposed between the third lens group and an image side of the single focus lens, wherein the first lens group, the second lens group, the third lens group, and the rear lens group are ordered sequentially from an object side of the single focus lens to the image side of the single focus lens.

According to aspects of the disclosure, a photographic apparatus is provided comprising: a single focus lens; and an image sensor configured to receive an image focused by the single focus lens, wherein the single focus lens comprises a first lens group having a negative refractive power, a second lens group having a positive refractive power, the second lens group being arranged to move in a direction that is transverse to an optical axis of the single focus lens, a third lens group having a negative refractive power that is arranged to perform a focusing function, and a rear lens group disposed between the third lens group and an image side of the single focus lens, wherein the first lens group, the second lens group, the third lens group, and the rear lens group are ordered sequentially from an object side of the single focus lens to the image side of the single focus lens.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Reference will now be made in detail to embodiments, examples of which are illustrated in the accompanying drawings, IN WHICH like reference numerals refer to like elements throughout. In this regard, the present embodiments may have different forms and should not be construed as being limited to the descriptions set forth herein. Accordingly, the embodiments are merely described below, by referring to the figures, to explain aspects.

Figure 1:
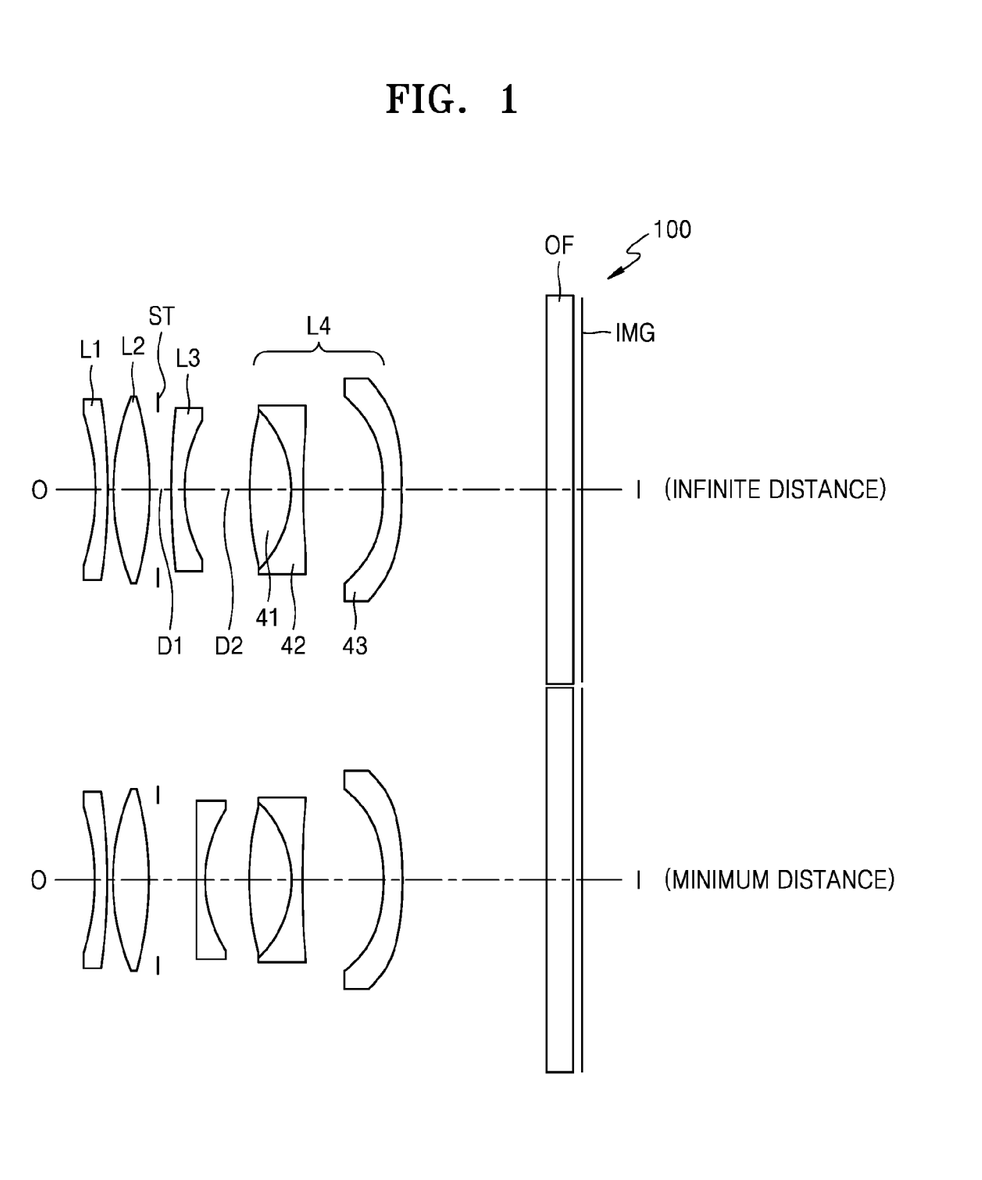
FIG. 1 is a diagram of an example of a lens, according to an embodiment of the present disclosure.

FIG. 1 is a diagram of an example of a single focus lens 100, according to an embodiment of the present disclosure. More particularly, FIG. 1 depicts the single focus lens 100 at an infinity distance and in a minimum distance, according to an embodiment. The single focus lens 100 may include, in an order from an object side O to an image side I, a first lens group L1 having a negative refractive power, a second lens group L2 having a positive refractive power, a third lens group L3 having a negative refractive power, and a rear lens group disposed on the image side I of the third lens group L3.

The second lens group L2 may move in a direction that is transverse (e.g., perpendicular) to an optical axis to prevent hand shaking. The third lens group L3 may be a focusing lens group.

As illustrated, the single focus lens 100 may have an image side I and an object side O. For example, when the single focus lens 100 is in use, the image side of the single focus lens 100 may be the side facing an image plane where an image is formed (e.g., facing the surface of an image sensor), and the object side of the single focus lens 100 may be the side facing a subject that is being photographed. Furthermore, the object side surface of a particular lens may be the lens surface facing the subject, and the image side surface thereof may be a lens surface facing the image plane (e.g., facing the surface of an image sensor).

The first lens group L1 may be configured as, for example, one lens having a negative refractive power. A lens of the first lens group L1 may be a meniscus lens that is concave to the object side of the single focus lens 100.

The second lens group L2 may be configured as, for example, one lens. The one lens may include at least one aspherical surface. The second lens group L2 may include, for example, a biconvex lens. The second lens group L2 may perform an image stabilization function. For example, the second lens group L2 may effectively correct an image biased due to vibration of an entire lens caused by external vibration such as hand shaking of a photographer. The second lens group L2 may include a biconvex aspherical surface, thereby correcting a spherical aberration of an entire lens system and reducing performance deterioration due to an aberration change when the biased image is corrected.

The third lens group L3 may include, for example, a meniscus lens concave toward the image side I. The meniscus lens may be, for example, an aspherical lens. The third lens group L3 may operate as a focusing lens. The third lens group L3 may have a refractive index less than 1.7. For example, the refractive index may be in the range from 1.4 to 1.7. The lens of the third lens group L3 may have, for example, an Abbe number greater than 55. The lens of the third lens group L3 may have, for example, the Abbe number in the range from 55 to 80. Thus, in some aspects, the lens may be made of a material that is lighter than a high refractive material, thereby enabling performance of auto focusing at high speed. Additionally or alternatively, the third lens group L3 may include an aspherical lens, thereby reducing a change in an astigmatic field curvature according to the change in the object distance.

A stop ST may be provided between the second lens group L2 and the third lens group L3. The first lens group L1 disposed on the object side O of the stop ST may include the concave meniscus lens, thereby effectively correcting sagittal coma aberration that occurs in large-aperture lens systems and thus implementing a small single focus lens having a large-aperture.

The space between the first lens group L1 and the second lens group L2 and the space between the second lens group L2 and the stop ST may be relatively smaller than a space between the third lens group L3 and the rear lens group L4, thereby effectively correcting spherical aberration and astigmatism.

The rear lens group L4 may include, for example, cemented lenses 41 and 42 and a lens 43. The cemented lenses 41 and 42 may include, for example, a positive lens 41 and a negative lens 42. The lens 43 may have a negative refractive power. The lens 43 may be a meniscus lens that is convex toward the image side I. The lens 43 that is closest to the image side of the rear lens group L4 may include, for example, at least one aspherical surface. The lens 43 may be a bi-aspherical lens. The positive lens 41 and the negative lens 42 may have a difference in their respective Abbe numbers that is greater than 7. Thus, an axial chromatic aberration may be effectively corrected. The meniscus aspherical lens that is disposed on the image side I that is closest to the rear lens group L4 may be used to correct astigmatism and astigmatic field curvature.

An image of an object may be incident on the image surface IMG through the first lens group L1, the second lens group L2, the third lens group L3, and the rear lens group L4. The image plane IMG may be, for example, a surface of a photographic device or a surface of an image sensor. The image sensor may include, for example, a charge-coupled device (CCD), a complementary metal-oxide semiconductor (CMOS), and/or any other suitable type of image sensor.

At least one optical filter OF may be provided between the rear lens group L4 and the image plane IMG. The optical filter OF may include, for example, at least one of a low pass filter, an infrared (IR)-cut filter, and cover glass. For example, when the IR-cut filter is provided as the optical filter OF, incoming infrared light may be prevented from reaching the image plane IMG. However, in some implementations, the optical filter may be omitted.

The single focus lens 100 according to an embodiment may correct hand shaking by using the second lens group L2 and perform focusing by using the third lens group L3, thereby enabling high quality still and moving image photography, while causing the single focus lens 100 to have a smaller size (e.g., by using fewer lenses).

A hand shaking correction lens group (second lens group L2) may be configured as one lens, the stop ST may be disposed on the image side I of the hand shaking correction lens group, and thus a driver driving the hand shaking correction lens group and a supporter supporting the stop ST may be manufactured. Hence, even if a hand shaking correction function is added, the driver of the hand shaking correction lens group may be used to achieve a smaller size of the photographic apparatus.

The focusing lens group (third lens group L3) may be configured as one lens, thereby permitting the use of a smaller actuator for driving the focusing lens group and the performance of auto focusing at higher speed.

The single focus lens 100 according to an embodiment may satisfy the following equation:

$$1.0 \leq La/f \leq 1.5 \qquad \text{<Equation 1>}$$

wherein La denotes a distance (an overall length) from the object side surface of a lens of the first lens group L1 that is closest to the object side O to the image plane IMG, and f denotes an overall focal length of the single focus lens.

When the ratio La/f exceeds the upper limit of Equation 1, since the overall length of the single focus lens 100 greatly increases in comparison to the focal length, a desired optical performance of the single focus lens 100 may be easily secured, but the barrel size of the lens 100 may be larger than what is desirable. When the ratio La/f falls below the lower limit of Equation 1, the barrel of the lens 100 may remain small, but it may be difficult to secure a desired optical performance due to aberration correction becoming more difficult.

The single focus lens 100 according to an embodiment may satisfy the following equation:

$$-0.5 \leq f3/f \leq -0.1 \qquad \text{<Equation 2>}$$

wherein f3 denotes a focal length of the third lens group L3, and f denotes an overall focal length of the single focus lens 100.

In Equation 2, if the ratio f3/f is smaller than the lower limit of Equation 2, the distance by which the third lens group L3 moves for auto focusing may be reduced, thereby permitting the entire lens system to become more compact. However, in such instances, the manufacturing complexity associated with the third lens group L3 may increase, and the performance of aberration correction may become difficult. If the ratio f3/f is greater than the upper limit of Equation 2, since the distance by which the third lens group L3 moves for auto focusing increases, it may be difficult to make the entire lens system sufficiently compact.

The single focus lens 100 according to an embodiment may have a field of view (FOV), for example, in the range from 40 degrees to 70 degrees. An F number may be in the range from 1.4 to 3.5. The single focus lens 100 according to an embodiment may include, for example, an image sensor corresponding to a film size of 35 mm (e.g., a full frame image sensor).

According to aspects of the disclosure, an aspherical surface used for the single focus lens 100 according to an embodiment may be defined as follows. When it is assumed that an optical axis direction is an X-axis and a direction perpendicular to the optical axis direction is a Y-axis, and a direction in which light travels is positive, the shape of an aspherical surface may be given by the following equation.

$$x = \frac{cy^2}{1+\sqrt{1-(K+1)c^2y^2}} + Ay^4 + By^6 + Cy^8 + Dy^{10} + \ldots \quad <\text{Equation 3}>$$

In Equation 3, "x" denotes a distance in the optical axis direction from the vertex of a lens, "y" denotes a distance in the direction perpendicular to the optical axis, "K" denotes a conic constant, "A", "B", "C", "D", . . . denote aspherical surface coefficients, and "c" denotes the reciprocal (1/R) of a radius of curvature at the vertex of a lens.

The single focus lens 100 may be implemented in accordance with various embodiments. Examples of some of the embodiments are further described below. Furthermore, for each of the discussed embodiments, a table is provided below that includes design data associated with the embodiment.

In the tables below, lens surface numbers 1, 2, 3 . . . n (where "n" is a natural number) refer to the order in which different lens surfaces are ordered from the object side O to the image side I of the zoom lens 100. For example, lens surface 1 may be the lens surface that is the closest to the object side O of the zoom lens 100. Similarly, lens surface 2 may be the lens surface that is the next closest to the object side O of the zoom lens 100. And the lens surface n may be the lens surface that is the furthest away from the object side O of the zoom lens 100.

Furthermore, in the tables below, "f" denotes a total focal length of the single focus lens 100, "Fno" denotes an F-number, "2ω" denotes a FOV, "OBJ" denotes an object, "RDY" denotes a radius of curvature, "THI" denotes a thickness of a lens or an air distance between lenses, "Nd" denotes a refractive index, "Vd" denotes an Abbe number, "ST" denotes the stop, and "ASP" denotes an aspherical surface.

First Embodiment

FIG. 1 illustrates the single focus lens 100 according to a first embodiment. Table 1 below shows an example of design data according to the first embodiment. In this example, f=44.9, Fno=2.46, and 2ω=52.76.

TABLE 1

| Lens Surface | RDY | THI | Nd | Vd |
|---|---|---|---|---|
| OBJ: | INFINITY | INFINITY | | |
| 1 | −28.82927 | 1.300000 | 1.752110 | 25.047 |
| 2 | −80.13103 | 0.800000 | | |
| 3 | 25.22000 | 4.263293 | 1.739600 | 49.110 |
| | ASP: | | | |
| | K: −0.061558 | | | |
| | A: −.129335E−04 B: 0.108302E−07 | | | |
| | C: −.532162E−09 D: 0.291536E−11 | | | |
| 4 | −38.83606 | 1.000000 | | |
| | ASP: | | | |
| | K: 0.052227 | | | |
| | A: 0.177798E−04 B: −.664286E−07 | | | |
| | C: 0.220700E−10 D: 0.142804E−11 | | | |
| ST | INFINITY | D1 | | |
| 6 | 873.72519 | 1.300000 | 1.514700 | 63.779 |
| 7 | 18.08647 | D2 | | |

TABLE 1-continued

| Lens Surface | RDY | THI | Nd | Vd |
|---|---|---|---|---|
| | ASP: | | | |
| | K: 0.737055 | | | |
| | A: −.233004E−04 B: 0.182605E−06 | | | |
| | C: −.205479E−08 D: 0.164279E−10 | | | |
| 8 | 49.77955 | 4.716424 | 1.8810035 | 40.138 |
| 9 | −13.24554 | 1.300000 | 1.6989493 | 30.065 |
| 10 | 83.32283 | 9.511499 | | |
| 11 | −31.81216 | 2.223034 | 1.514700 | 63.779 |
| | ASP: | | | |
| | K: 0.087308 | | | |
| | A: −.177753E−03 B: 0.287632E−06 | | | |
| | C: −.201214E−08 D: −.673457E−11 | | | |
| 12 | −78.70767 | 17.000000 | | |
| | ASP: | | | |
| | K: 11.506874 | | | |
| | A: −.136722E−03 B: 0.455649E−06 | | | |
| | C: −.210447E−08 D: 0.375407E−11 | | | |
| 13 | INFINITY | 3.000000 | 1.5167983 | 64.197 |
| 14 | INFINITY | 0.967390 | | |
| IMG | INFINITY | | | |

Table 2 below shows an example of different distances, according to the first embodiment.

TABLE 2

| Variable Distance | Infinite Distance (Infinity) | Minimum Distance (Macro) |
|---|---|---|
| D1 | 1.8613 | 4.364 |
| D2 | 7.7245 | 5.2217 |

The minimum distance may be, for example, 400 mm.

Figure 2:
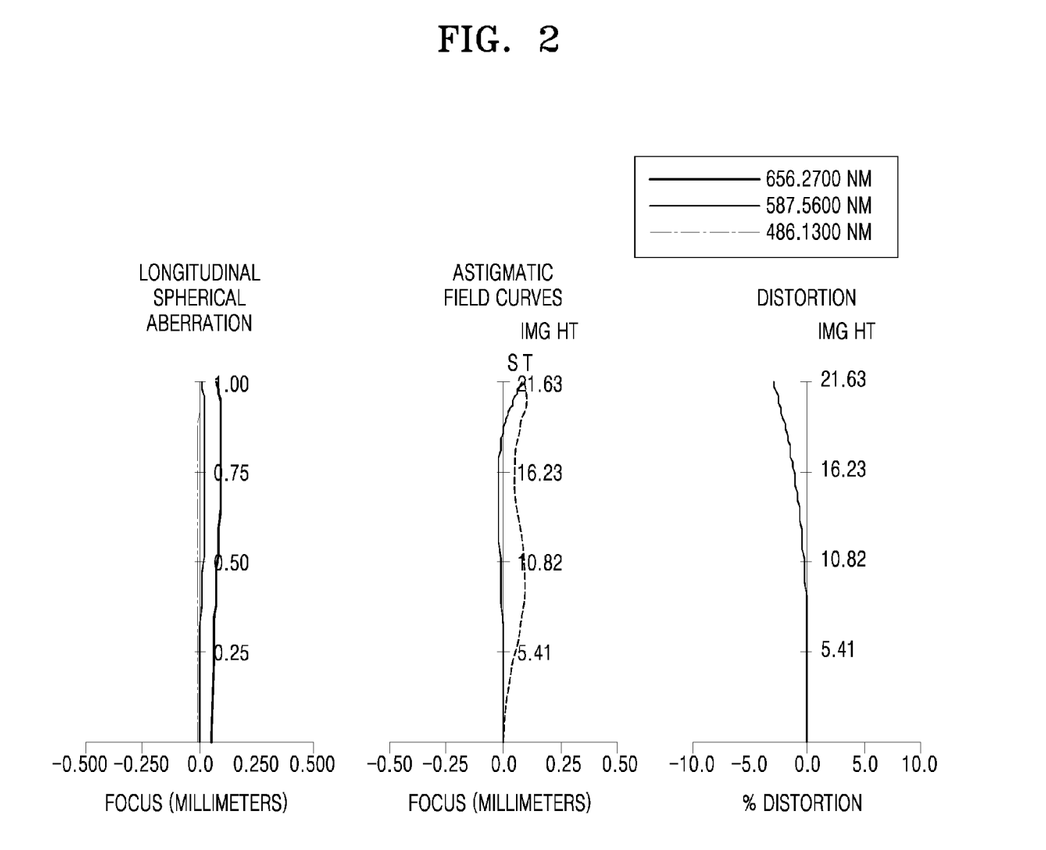
FIG. 2 illustrates an example of longitudinal spherical aberration, astigmatic field curves, and distortion that are associated with the lens of FIG. 1, according to an embodiment of the present disclosure.

FIG. 2 illustrates an example of longitudinal spherical aberration, astigmatic field curves, and distortion that are associated with the first embodiment when the single focus lens is set at the minimum focal distance and the infinite distance. The astigmatic field curves include a tangential field curvature (T) and a sagittal field curvature (S).

Second Embodiment

Figure 3:
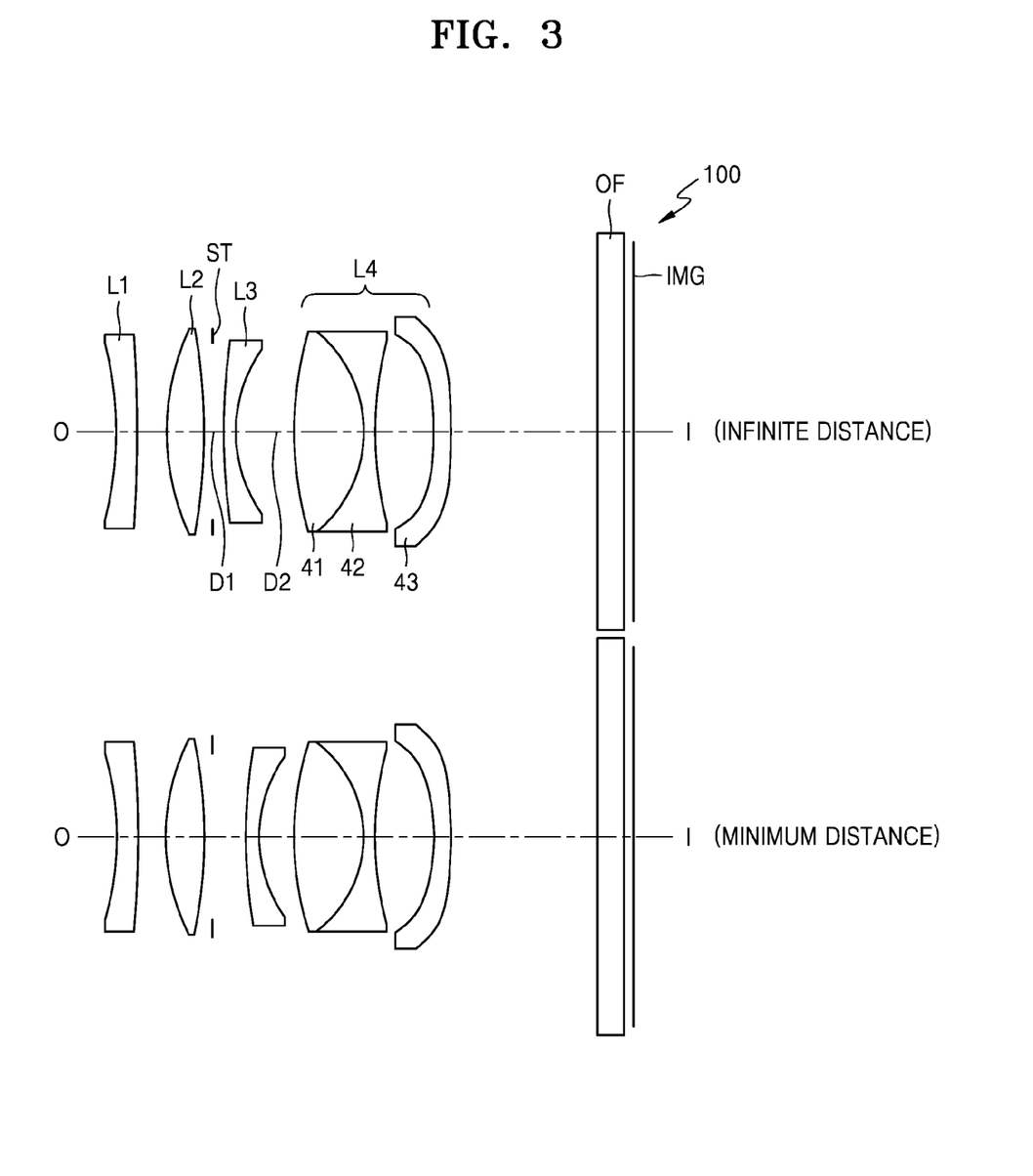
FIG. 3 is a diagram of an example of a lens, according to another embodiment of the present disclosure.

FIG. 3 is a diagram illustrating an example of the single focus lens 100, according to a second embodiment. Table 3 below shows an example of design data according to the second numerical value embodiment. In this example, f=46.3, Fno=2.46, and 2ω=51.4.

TABLE 3

| Lens Surface | RDY | THI | Nd | Vd |
|---|---|---|---|---|
| OBJ: | INFINITY | INFINITY | | |
| 1: | −37.71847 | 2.500000 | 1.741274 | 27.7522 |
| 2: | −190.46052 | 3.254609 | | |
| 3: | 23.52585 | 4.696218 | 1.739913 | 48.9114 |
| | ASP: | | | |
| | K: 0.021743 | | | |
| | A: −.116656E−04 B: 0.147817E−07 | | | |
| | C: −.580821E−09 D: 0.199731E−11 | | | |
| 4: | −57.69000 | 1.000000 | | |
| | ASP: | | | |
| | K: 1.530694 | | | |
| | A: 0.157708E−04 B: −.691809E−07 | | | |
| | C: 0.165013E−11 D: 0.816926E−12 | | | |
| ST: | INFINITY | D1 | | |
| 6: | 100.27104 | 1.400000 | 1.555334 | 49.0224 |
| 7: | 17.21972 | D2 | | |

TABLE 3-continued

| Lens Surface | RDY | THI | Nd | Vd |
|---|---|---|---|---|
| | ASP: | | | |
| | K: 0.630755 | | | |
| | A: −.269634E−04 B: 0.116552E−06 | | | |
| | C: −.142481E−08 D: 0.247552E−11 | | | |
| 8: | 37.16506 | 8.326005 | 1.881003 | 40.1388 |
| 9: | −14.72995 | 1.400000 | 1.698949 | 30.0657 |
| 10: | 39.31221 | 6.938978 | | |
| 11: | −96.54037 | 2.200000 | 1.521888 | 60.3741 |
| | ASP: | | | |
| | K: −5.314901 | | | |
| | A: −.181046E−03 B: 0.150219E−06 | | | |
| | C: −.294349E−08 D: −.613699E−11 | | | |
| 12: | −1000.00000 | 21.000000 | | |
| | ASP: | | | |
| | K: −20.000000 | | | |
| | A: −.147462E−03 B: 0.339083E−06 | | | |
| | C: −.293061E−08 D: 0.786007E−11 | | | |
| 13: | INFINITY | 3.000000 | 1.516798 | 64.1983 |
| 14: | INFINITY | 0.975592 | | |
| IMG: | INFINITY | | | |

Table 2 below shows an example of different distances, according to the second embodiment.

TABLE 4

| Variable Distance | Infinite Distance (Infinity) | Minimum Distance |
|---|---|---|
| D1 | 1.5 | 4.2254 |
| D2 | 6.7842 | 4.0587 |

Figure 4:
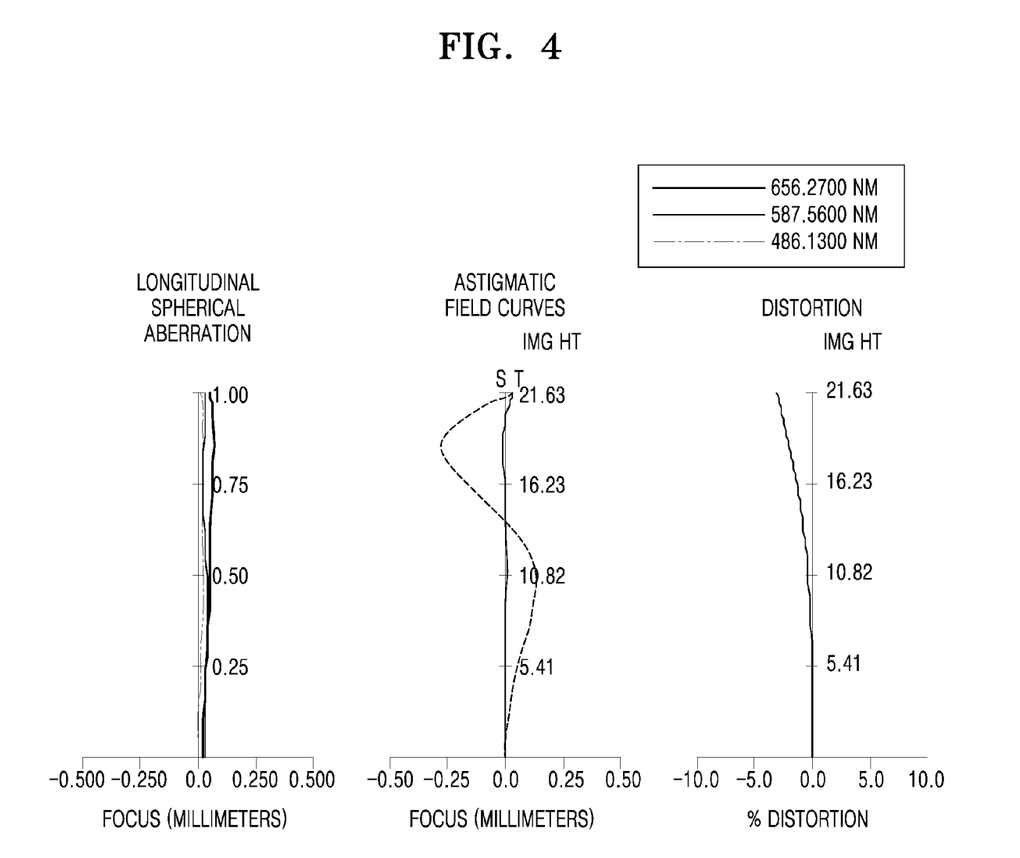
FIG. 4 illustrates an example of longitudinal spherical aberration, astigmatic field curves, and distortion that are associated with the lens of FIG. 3, according to an embodiment of the present disclosure.

FIG. 4 illustrates longitudinal spherical aberration, astigmatic field curves, and distortion associated with the first embodiment when the single focus lens is set at the minimum focal distance and the infinite distance.

Third Embodiment

Figure 5:
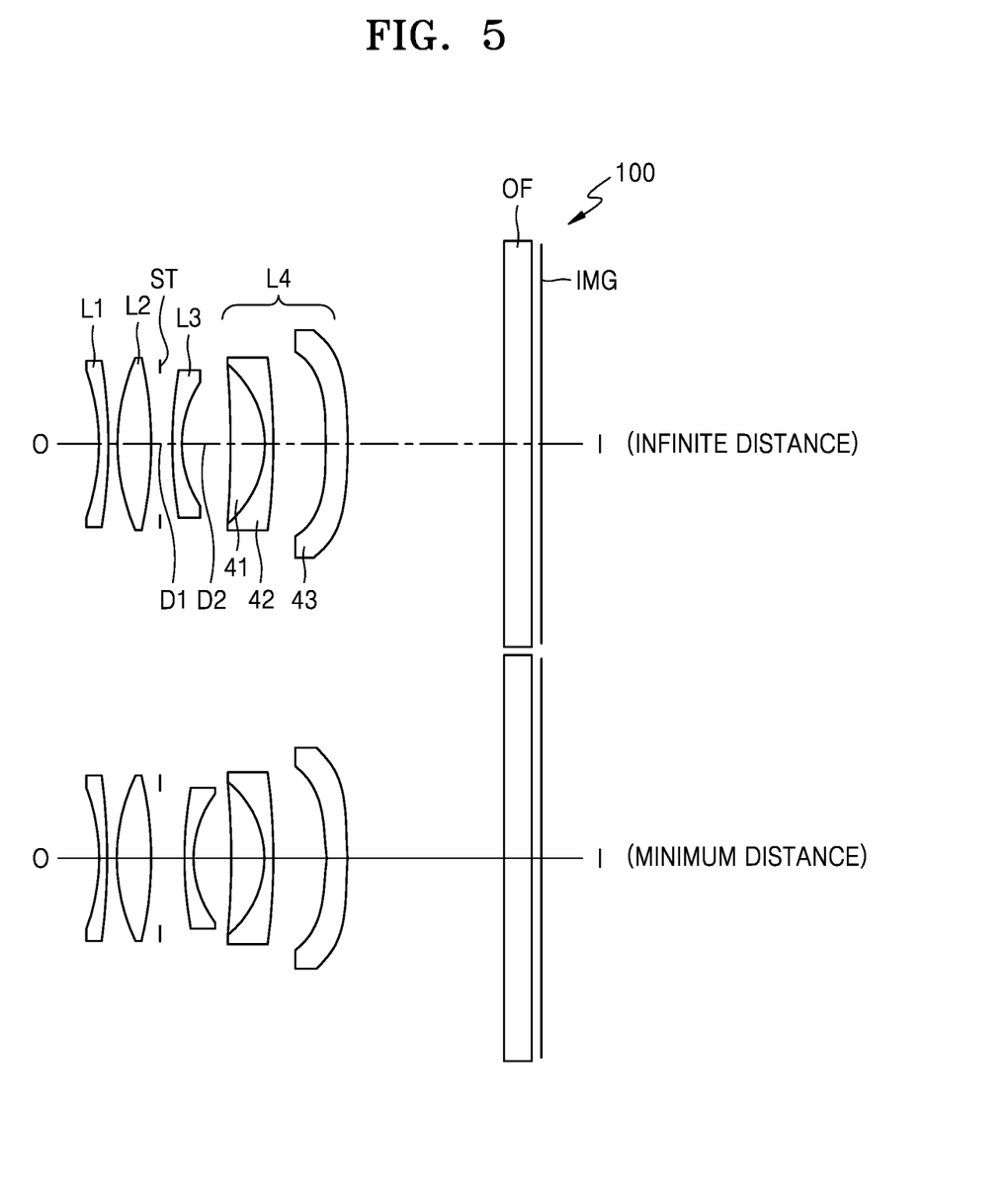
FIG. 5 is a diagram of an example of a lens, according to yet another embodiment of the present disclosure.

FIG. 5 is a diagram illustrating an example of the single focus lens 100, according to a third embodiment. Table 5 below shows an example of design data according to the third embodiment. In this example, f=44.0, Fno=2.86, and 2ω=53.3.

TABLE 5

| Lens Surface | RDY | THI | Nd | Vd |
|---|---|---|---|---|
| OBJ: | INFINITY | INFINITY | | |
| 1: | −23.71513 | 1.100000 | 1.741540 | 27.5550 |
| 2: | −51.34736 | 0.800000 | | |
| 3: | 18.02034 | 3.917639 | 1.764534 | 50.1012 |
| | ASP: | | | |
| | K: −0.304371 | | | |
| | A: −.199965E−04 B: −.452645E−07 | | | |
| | C: −.674608E−09 D: −.478172E−11 | | | |
| 4: | −42.20775 | 1.000000 | | |
| | ASP: | | | |
| | K: 2.034216 | | | |
| | A: 0.182519E−04 B: −.457578E−07 | | | |
| | C: −.399010E−09 D: −.260391E−11 | | | |
| ST: | INFINITY | D1 | | |
| 6: | 43.30592 | 1.100000 | 1.682643 | 31.7616 |
| 7: | 13.73679 | D2 | | |

TABLE 5-continued

| Lens Surface | RDY | THI | Nd | Vd |
|---|---|---|---|---|
| | ASP: | | | |
| | K: 0.650602 | | | |
| | A: −.120154E−04 B: −.247212E−06 | | | |
| | C: 0.190292E−08 D: −.969801E−10 | | | |
| 8: | −91.92472 | 3.795495 | 1.732872 | 52.2029 |
| 9: | −11.54214 | 1.100000 | 1.546080 | 45.3692 |
| 10: | −62.71292 | 6.108159 | | |
| 11: | −43.74800 | 2.200000 | 1.575843 | 68.8668 |
| | ASP: | | | |
| | K: −13.463725 | | | |
| | A: −.198852E−03 B: 0.345893E−06 | | | |
| | C: −.668328E−08 D: 0.195671E−10 | | | |
| 12: | −1000.00000 | 18.000000 | | |
| | ASP: | | | |
| | K: 20.000000 | | | |
| | A: −.151948E−03 B: 0.362706E−06 | | | |
| | C: −.313880E−08 D: 0.711286E−11 | | | |
| 13: | INFINITY | 3.000000 | 1.516798 | 64.1983 |
| 14: | INFINITY | 0.949614 | | |
| IMG: | INFINITY | | | |

Table 6 below shows an example of different distances, according to the third embodiment.

TABLE 6

| Variable Distance | Infinite Distance | Minimum Distance |
|---|---|---|
| D1 | 1.5 | 2.9493 |
| D2 | 5.3787 | 3.9294 |

Figure 6:
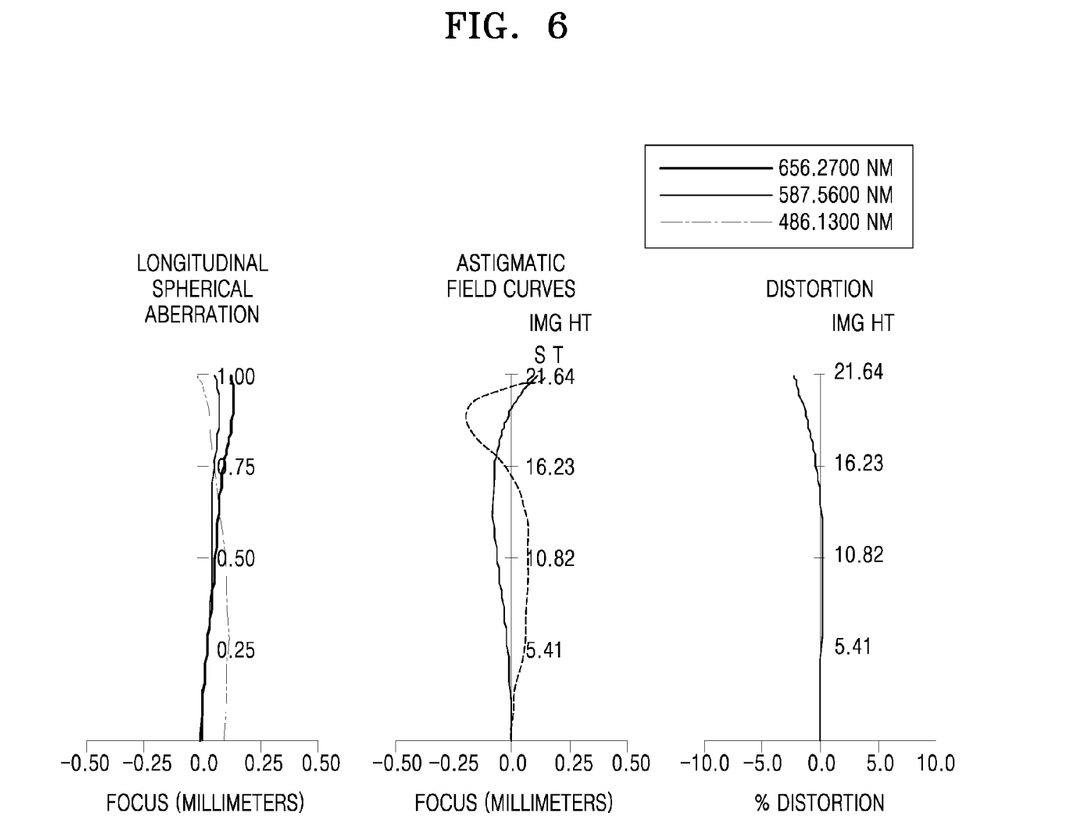
FIG. 6 illustrates an example of longitudinal spherical aberration, astigmatic field curves, and distortion that are associated with the lens of FIG. 5, according to an embodiment of the present disclosure.

FIG. 6 illustrates longitudinal spherical aberration, astigmatic field curves, and distortion associated with the first embodiment when the single focus lens is set at the minimum focal distance and the infinite distance.

Table 7 below illustrates the values of the ratios associated with Equations 1-2 for Embodiments 1-3, respectively:

TABLE 7

| | $1^{st}$ Embodiment | $2^{nd}$ Embodiment | $3^{rd}$ Embodiment |
|---|---|---|---|
| La/f (Eq. 1) | 1.268 | 1.4 | 1.136 |
| f3/f (Eq. 2) | −0.8 | −0.81 | −0.68 |

Figure 7:
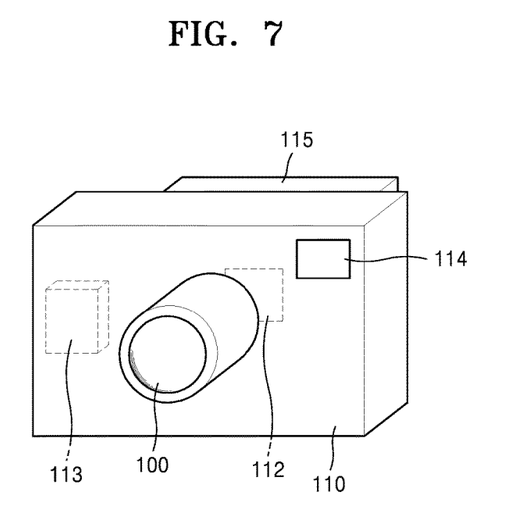
FIG. 7 is a diagram of an example of a photographic apparatus, according to an embodiment.

The single focus lens 100 according to the embodiments may be used in a small form factor photographic apparatus to enable high quality still and moving image photography. According to aspects of the disclosure, a hand shaking correction lens group and a focusing lens group may be provided in the single focus lens 100 in a manner which permits the single focus lens 100 to be small and lightweight, thereby allowing manufacture of a small photographic apparatus. The focusing lens group may be configured to include a small and lightweight lens, thereby enabling the performance of prompt auto focusing. The single focus lens 100 according to the embodiments may be used in a photographic apparatus employing an image sensor. The photographic apparatus a digital camera, an interchangeable lens camera, a video camera, a cellular phone camera, a mirrorless camera, a small mobile device, and/or any other suitable type of device FIG. 7 illustrates a photographic apparatus 110 including the single focus lens 100 according to an embodiment of the present invention. The photographic apparatus 110 may include the single focus lens 100 and an image sensor 112 receiving an optical image formed by the photographic lens 100 and converting the optical image into an image signal. The photographic apparatus 110 may include a recorder 113 recording information corresponding to an object image that is photoelectrically converted by the image sensor 112 and a viewfinder 114 for observing the object image. The photographic apparatus 110 may further include a display 115 displaying the object image. In this regard, although the viewfinder 114 and the display 115 are separately provided, only the display 115 without the viewfinder 114 may be provided. The photographic apparatus 110 of FIG. 7 is a mere example and is not limited thereto.

FIGS. 1-7 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

While one or more embodiments have been described with reference to the figures, it will be understood by those of ordinary skill in the art that various changes in form and details may be made therein without departing from the spirit and scope as defined by the following claims.

What is claimed is:

1. A single focus lens comprising:
   a first lens group having a negative refractive power;
   a second lens group having a positive refractive power, the second lens group being arranged to move in a direction that is transverse to an optical axis of the single focus lens;
   a third lens group having a negative refractive power that is arranged to perform a focusing function;
   a stop disposed between the second lens group and the third lens group, and
   a rear lens group disposed between the third lens group and an image side of the single focus lens, wherein the first lens group, the second lens group, the third lens group, and the rear lens group are ordered sequentially from an object side of the single focus lens to the image side of the single focus lens.

2. The single focus lens of claim 1, wherein the single focus lens satisfies the following condition:

$1.0 \leq La/f \leq 1.5$, where La denotes a distance from an object side surface of a lens in the first lens group that is closest to the object side of the single focus lens to an image plane, and f denotes an overall focal length of the single focus lens.

3. The single focus lens of claim 1, wherein the single focus lens satisfies the following condition:

$-0.5 \leq f3/f \leq -0.1$, where f3 denotes a focal length of the third lens group, and f denotes an overall focal length of the single focus lens.

4. The single focus lens of claim 1, wherein the first lens group comprises one meniscus lens having a convex image side surface.

5. The single focus lens of claim 1, wherein the second lens group comprises at least one lens having an aspherical surface.

6. The single focus lens of claim 1, wherein the third lens group comprises an aspherical lens.

7. The single focus lens of claim 6, wherein the aspherical lens of the third lens group has a refractive index of less than 1.7.

8. The single focus lens of claim 6, wherein the aspherical lens of the third lens group has an Abbe number greater than 55.

9. The single focus lens of claim 1, wherein the rear lens group comprises at least one cemented lenses.

10. The single focus lens of claim 9, wherein the cemented lenses comprise a positive lens and a negative lens.

11. The single focus lens of claim 10, wherein Abbe numbers of the positive lens and the negative lens of the cemented lenses have a difference greater than 7.

12. The single focus lens of claim 10, wherein the rear lens group further includes an aspherical lens.

13. The single focus lens of claim 1, wherein the rear lens group includes a meniscus lens that is convex toward the image side of the single focus lens.

14. A photographic apparatus comprising:
    a single focus lens; and
    an image sensor configured to receive an image focused by the single focus lens, wherein the single focus lens comprises a first lens group having a negative refractive power, a second lens group having a positive refractive power, the second lens group being arranged to move in a direction that is transverse to an optical axis of the single focus lens, a third lens group having a negative refractive power that is arranged to perform a focusing function, a stop disposed between the second lens group and the third lens group, and a rear lens group disposed between the third lens group and an image side of the single focus lens, wherein the first lens group, the second lens group, the third lens group, and the rear lens group are ordered sequentially from an object side of the single focus lens to the image side of the single focus lens.

* * * * *